(12) United States Patent
Park et al.

(10) Patent No.: US 7,532,549 B2
(45) Date of Patent: May 12, 2009

(54) METHOD OF RECORDING FILE SYSTEM INFORMATION OF WRITE-ONCE HIGH DENSITY OPTICAL DISC AND REPRODUCING METHOD THEREOF

(75) Inventors: Sung Wan Park, Suwon-si (KR); Si Jung Noh, Ulsan-si (KR); Byung Jin Kim, Seongnam-si (KR)

(73) Assignee: LG Electronics, Inc., Seoul (KR)

( * ) Notice: Subject to any disclaimer, the term of this patent is extended or adjusted under 35 U.S.C. 154(b) by 835 days.

(21) Appl. No.: 11/107,898

(22) Filed: Apr. 18, 2005

(65) Prior Publication Data

US 2005/0234863 A1    Oct. 20, 2005

(30) Foreign Application Priority Data

Apr. 19, 2004    (KR) .................. 10-2004-0026757

(51) Int. Cl.
*G11B 21/08*    (2006.01)
(52) U.S. Cl. ................. 369/30.04; 369/53.41

(58) Field of Classification Search ............... None
See application file for complete search history.

(56) References Cited

U.S. PATENT DOCUMENTS 5,889,742 A * 3/1999 Kuroda .................. 369/59.26

* cited by examiner

*Primary Examiner*—Paul Huber
(74) *Attorney, Agent, or Firm*—Harness, Dickey & Pierce (57) ABSTRACT

The present invention provides a method of recording file system information of a write-once high density optical disc and reproducing method thereof, by which the robust file system information can be provided and by which the efficient reproduction of the optical disc is enables using the newly configured file system information. In recording file system information within a write-once optical disc, the present invention includes the step of recording file information of a former session and updated file information of a current session together within a metadata file of the current session or the step of recording updated file information only from file information of a former session within a metadata file of a current session.

8 Claims, 9 Drawing Sheets

METHOD OF RECORDING FILE SYSTEM INFORMATION OF WRITE-ONCE HIGH DENSITY OPTICAL DISC AND REPRODUCING METHOD THEREOF

This application claims the benefit of the Korean Application No. 10-2004-0026757, filed on Apr. 19, 2004, which is hereby incorporated by reference as if fully set forth herein.

BACKGROUND OF THE INVENTION

1. Field of the Invention

The present invention relates to a method of recording file system information of a write-once high density optical disc, and more particularly, to a method of recording file system information of a write-once high density optical disc and reproducing method thereof.

2. Discussion of the Related Art

Generally, an optical disc on which a large capacity of data is recordable is widely used as an optical record medium. Recently, many efforts are made to develop a new high density optical record medium (HD-DVD), on which video data of high definition and audio data of high quality can be recorded and stored, such as a Blu-ray disc (hereinafter abbreviated BD) and the like.

The Blu-ray disc (BD) as a next generation HD-DVD technology is the next generation optical record solution enabling the storage of data to remarkably surpass the previous DVD, and the technology specifications of global standards for the BD are lately established together with other digital equipments.

Moreover, although many efforts are made to develop optical record players adopting the BD specifications, there are many difficulties in developing the complete optical record player since the BD specifications fail to be fully established yet.

Specifically, in order to efficiently reproduce the data recorded in the BD, a file system for managing files of the recorded data is essentially needed, which should be systematized and needs to be provided by a specified system.

However, the current BD specifications fail to be equipped with the unified specifications for the menu information, whereby limitation is greatly put on the development of the full-scale Blu-ray disc (BD) based optical record players.

SUMMARY OF THE INVENTION

Accordingly, the present invention is directed to a method of recording file system information of a write-once high density optical disc and reproducing method thereof that substantially obviate one or more problems due to limitations and disadvantages of the related art.

An object of the present invention is to provide a method of recording file system information of a write-once high density optical disc and reproducing method thereof, by which new file system information suitable for the write-once high density optical disc is recorded and by which the optical disc is reproduced using the recorded file system information.

Another object of the present invention is to provide a method of recording file system information of a write-once high density optical disc and reproducing method thereof, by which a per session meta data file is efficiently updated as the file system information within the optical disc.

A further object of the present invention is to provide a method of recording file system information of a write-once high density optical disc and reproducing method thereof, by which the optical disc (BD-WO) is efficiently reproduced using the recorded file system information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in recording file system information within a write-once optical disc, a file system information recording method of the write-once optical disc according to the present invention includes the step of recording file information of a former session and updated file information of a current session together within a metadata file of the current session.

In another aspect of the present invention, in recording file system information within a write-once optical disc, a file system information recording method of the write-once optical disc includes the step of recording updated file information only from file information of a former session within a metadata file of a current session.

In another aspect of the present invention, a method of reproducing a write-once optical disc includes the steps of reading file information about entire closed session areas recorded within a metadata file of a final closed session and reproducing the closed session areas using the read file information.

In a further aspect of the present invention, a method of reproducing a write-once optical disc includes the steps of reading a metadata partition map indicating locations of entire metadata files within a final closed session, reading file information recorded within at least one closed session area from the read metadata partition map, and reproducing the closed session areas using the read file information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. Besides, although terms used in the present invention are possibly selected from the currently well-known ones, some terms are arbitrarily chosen by the applicant in some cases so that their meanings are explained in detail in the following description. Hence, the present invention should be understood with the meanings of the corresponding terms chosen by the applicant instead of the simple names of the terms.

'File system' used in the present invention means information for managing all files recorded in an optical disc as well as a logical structure of an entire disc, which is named 'disc volume'. The 'file system' means information that is recognized not by a user but by a system.

Hence, 'file system information' in the present invention means various kinds of information configuring a file system and corresponds to 'volume structure' indicating a disc structure of an entire disc volume, 'anchor pointer', 'metadata file' containing disc location and attribute of a file recorded within a disc, 'metadata file entry (MD File FE)' indicating a location of a metadata file, etc. Optionally, 'metadata mirror file' having the same content of the 'metadata file' can be separately provided within the disc to secure robustness.

Moreover, there exist various kinds of file systems applicable to an optical disc according to characteristics of optical disc specifications. 'UDF (universal disc format)' exists as a globally applicable file system. And, the present invention employs the UDF file system in the following for example.

The present invention is characterized in providing various methods for recording the file system information on a write-once recordable optical disc, and more particularly, in recording (updating) per session file system information, which are explained with reference to the attached drawings as follows.

Figure 1A:
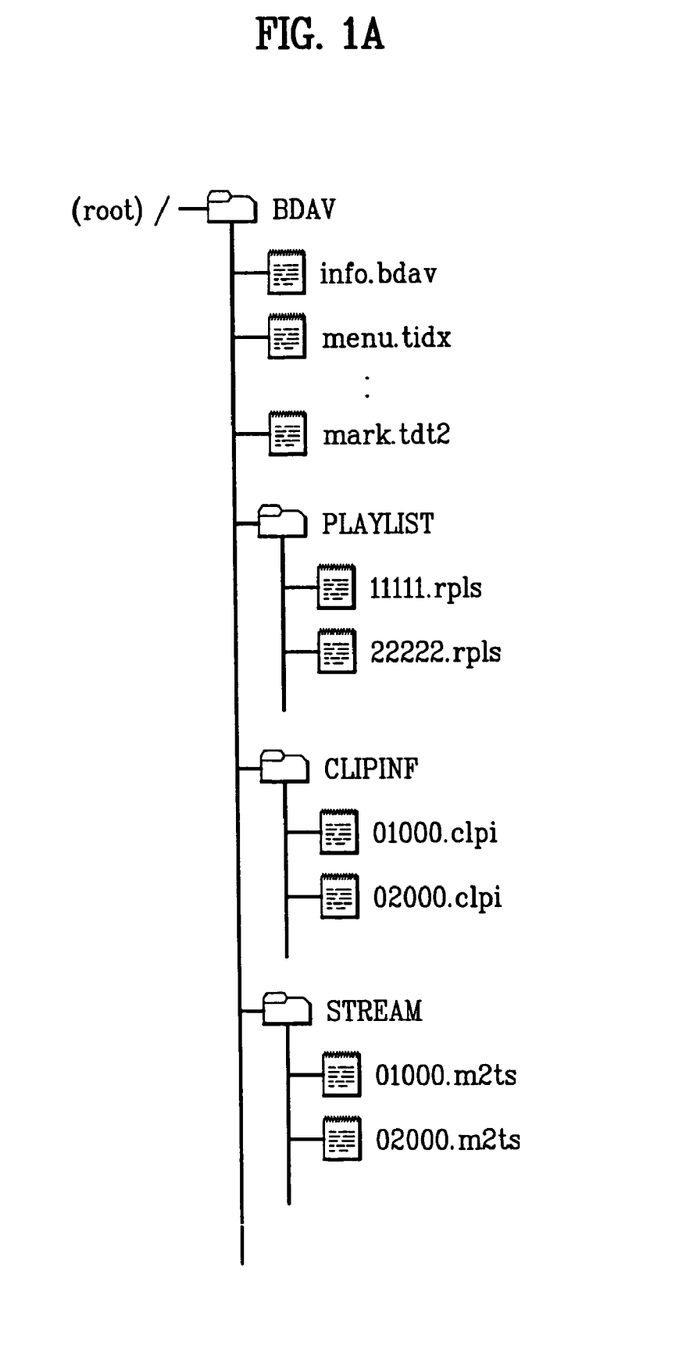
FIG. 1A is a diagram of a file structure of a write-once high density optical disc according to one embodiment of the present invention.
Figure 1B:
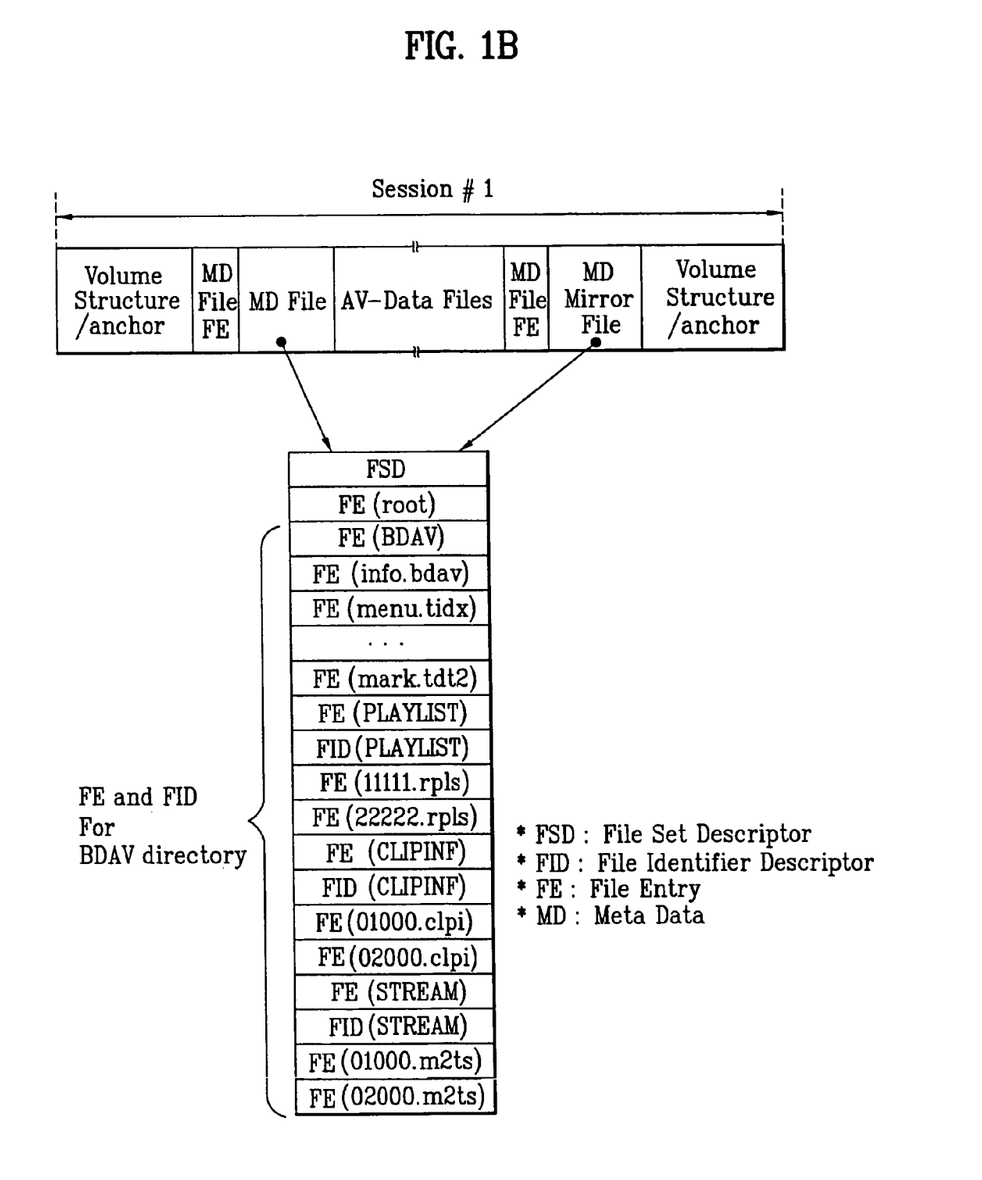
FIG. 1B is a diagram for explaining a method of recording file system information in a write-once high density optical disc according to one embodiment of the present invention.
Figure 2A:
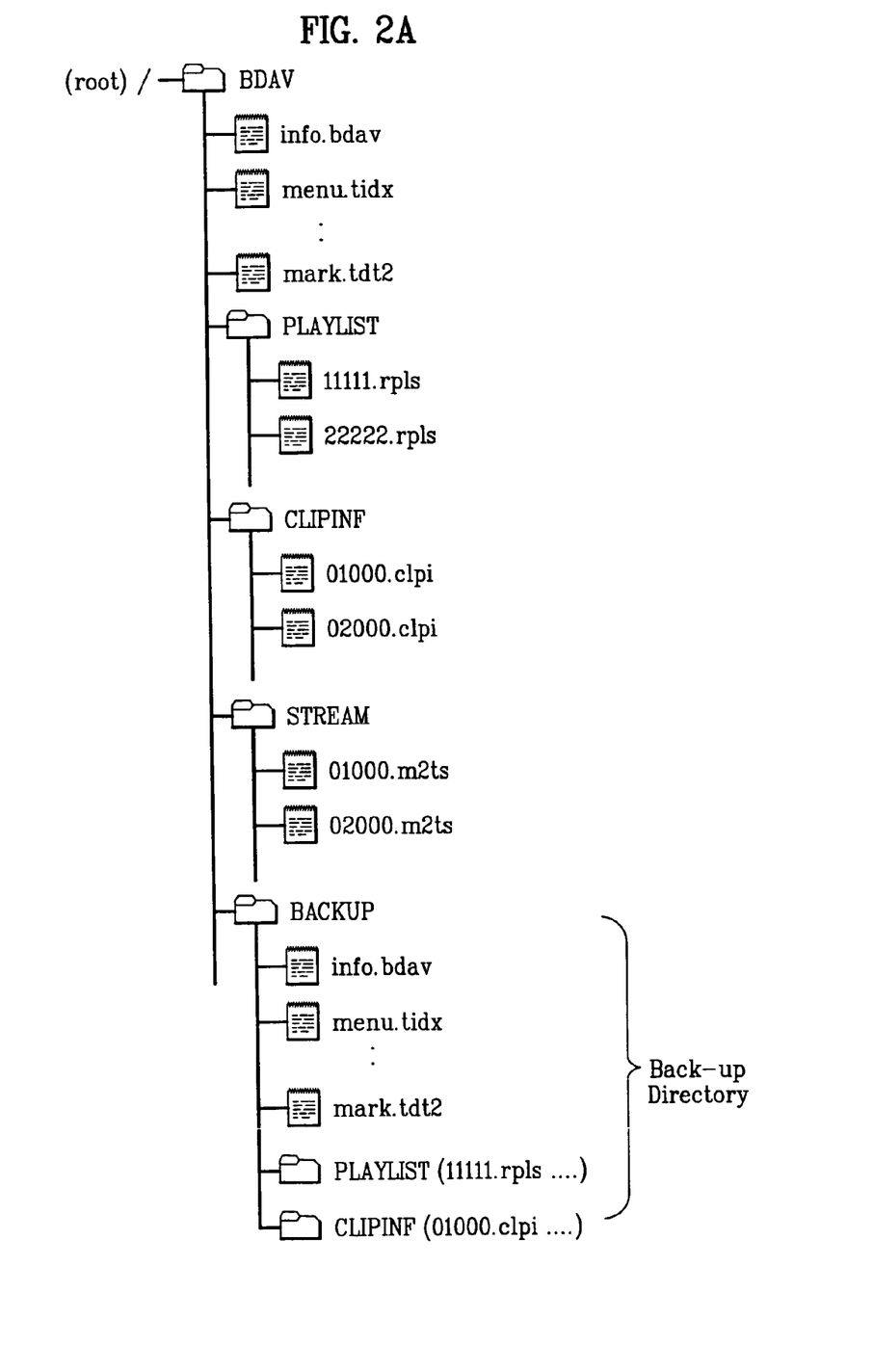
FIG. 2A is a diagram of a file structure of a write-once high density optical disc according to another embodiment of the present invention.
Figure 2B:
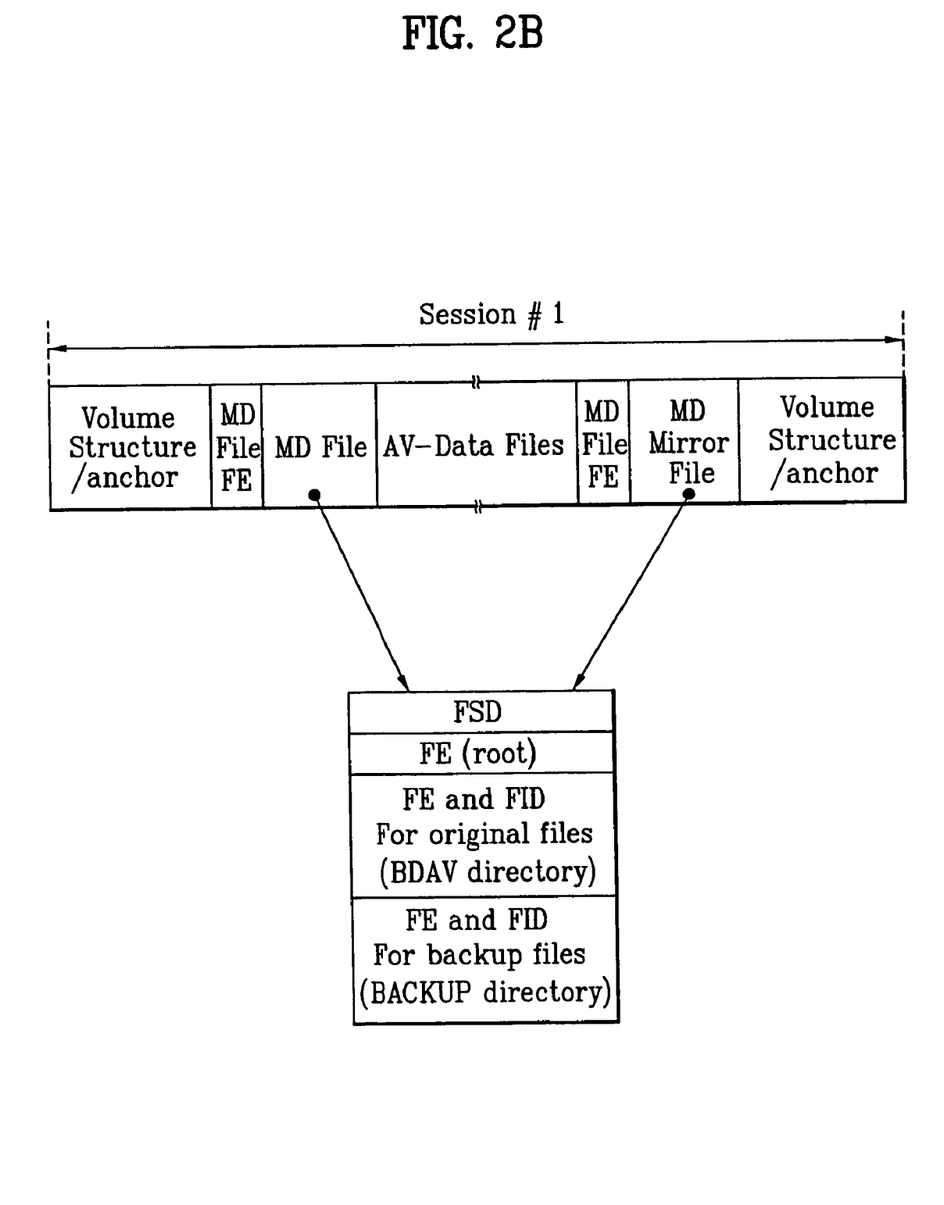
FIG. 2B is a diagram for explaining a method of recording file system information in a write-once high density optical disc according to another embodiment of the present invention.

First of all, FIGS. 1A to 2B show a file structure recorded on a write-once recordable optical disc and a method of recording file system information about the file structure according to the present invention. Specifically, FIG. 2A and FIG. 2B show the case that a backup file corresponding to an original file is provided, which is explained in detail as follows.

FIG. 1A show an example of files recorded on a write-once high density optical disc according to one embodiment of the present invention, and FIG. 1B shows an example of a method of recording file system information for managing the files.

FIG. 1A is a diagram of data recorded within an optical disc and a file structure of managing the recorded data.

Referring to FIG. 1, at least one BD directory BDAV exists beneath one root directory. In the BD directory BDAV, an info file info.bdav as general file (higher file) information to secure interactivity with a user, a menu file menu.tidx, and the like are included. The BD directory BDAV further includes three directories having reproduction information of data substantially recorded within the disc and information about reproducing the recorded data and the like. The three directories are a playlist directory PLAYLIST, a clipinfo directory CLIPINF, and a stream directory STREAM.

Specifically, files 01000.m2ts and 02000.m2ts for video and audio streams recorded according to specific formats within a disc are recorded within the stream directory STREAM. Each of the stream files 01000.m2ts and 02000.m2ts means AV or PC data recorded on a specific area within the disc.

The clipinfo directory CLIPINF consists of clipinfo files *.clpi in one-to-one correspondence to the AV stream files (*.m2ts), respectively. The clipinfo directory CLIPINF means a directory in which a sort of management files including attribute information and reproduction timing information of the corresponding stream (*.m2ts) files are recorded. Specifically, in the BD specifications, the one-to-one corresponding stream file (*.m2ts) and the clipinfo file (*.clpi) are combined to be named 'clip'. Hence, the file '01000.clpi' within the clipinfo directory CLIPINF includes the attribute information and the like of the stream file '01000.m2ts' within the stream directory STREAM, and the files '01000.clpi' and '01000.m2ts' configure one clip.

The playlist directory PLAYLIST consists of playlist files (*.rpls), and each of the playlist files (*.rpls) includes at least one play item PlayItem performing a reproduction of a specific clip. Hence, the playlist file (*.rpls) means a basic reproduction management file that performs a reproduction of a specific clip combination by the combination of the at least one play item PlayItem.

FIG. 1B is a diagram for explaining a method of recording the files according to the file structure in FIG. 1 and the file system information in an optical disc.

Namely, a session for data recording is allocated to a write-once optical disc. After completion of the data recording during the session, the corresponding session is closed and is then reserved as a play-only area without performing no more recording thereon. A plurality of sessions (multi-session) can be provided to the write-once optical disc. Yet, there exists one recordable session only, which is called 'open session'. And, the rests are configured with play-only 'closed sessions' where no recording can be performed. Specifically, in case of a continuous recording system, a most outer circumferential session becomes the open session and the previous sessions correspond to the closed sessions.

Hence, FIG. 1B shows an example of the 'closed session' where the recording is completed within the corresponding session (closed session).

Namely, the file data according to the file structure in FIG. 1A is recorded in 'AV-Data File' area during the closed session, and the file system information is recorded in right and left areas to the 'AV-Data File' area. In this case, the same contents are recorded in the right and left areas to the 'AV-Data File' area to secure robustness of the data.

'Volume structure/anchor' indicating a structure of an entire disc volume, 'metadata file (MD file)' indicating disc location and attribute of the file recorded during the disc, and 'metadata file entry (MD File FE)' indicating a location of the metadata file are recorded in an area where one file system information is recorded. And, the file system information, as mentioned in the foregoing description, is repeatedly recorded with the same contents in another area where the file system information is recorded.

Specifically, the repeatedly recorded 'metadata file' is named 'metadata mirror file (MD Mirror File)' for convenience of explanation. Yet, as the same contents are repeatedly recorded substantially, it is apparent that the information recorded prior to the 'AV-Data File' area can be called 'metadata mirror file (MD Mirror File)'.

The 'metadata file' or 'metadata' recorded in the 'metadata mirror file' is explained in detail as follows.

First of all, 'metadata' generally includes its file entry FE containing location and attribute information for each file recorded during a disc. And, the metadata further includes a file set descriptor FSD describing an overall file structure and a file identity descriptor FID describing attribute of a specific directory.

Hence, the file entry FE for each file in FIG. 1A is recorded in the metadata file MD File in FIG. 1B. And, the metadata file entry MD File FE includes the information of the location and attribute of the metadata file MD File.

Figure 5:
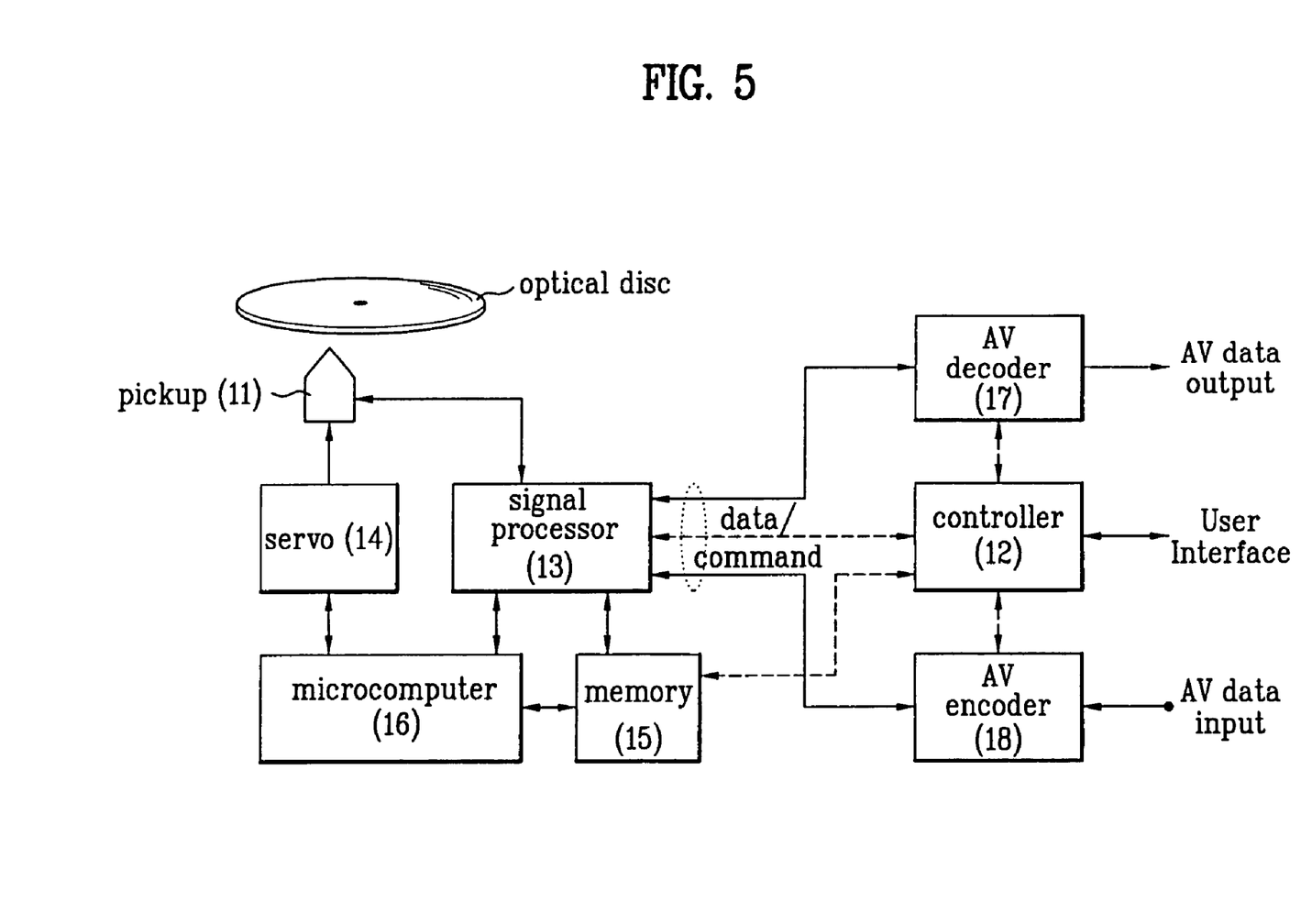
FIG. 5 is a block diagram of an optical record/reproduce apparatus according to the present invention.

Consequently, an optical record/reproducing apparatus in FIG. 5 checks the metadata file recorded in the write-once optical disc to comprehend the file structure during the entire disc and to confirm the attributes of the respective files, their recorded locations during the disc, and the like. Hence, the apparatus can utilize the metadata in reproducing a specific file from the optical disc.

FIG. 2A is a diagram of a file structure of a write-once high density optical disc according to another embodiment of the present invention and FIG. 2B is a diagram for explaining a method of recording file system information in a write-once high density optical disc according to another embodiment of the present invention, in which a backup file corresponding to an original file is provided.

Referring to FIG. 2A, a 'BACKUP' directory is separately provided beneath the 'BDAV' directory in the file structure of FIG. 1A, and management file information during the 'BDAV' directory is copied for backup during the 'BACKUP' directory. Hence, all management files except the 'STREAM' directory, in which real data are recorded, among the original files are recorded during the 'BACKUP' directory, whereby disc reproduction is enabled despite partial loss of the management files.

Besides, even if the present invention proposes the structure that the 'BACKUP' directory lies beneath the 'BDAV' directory, it is apparent that the backup files can be recorded with various file structures to achieve the same objectives.

FIG. 2B shows a method of recording the files according to the file structure in FIG. 2A and the file system information during the disc.

Referring to FIG. 2B, the same recording method of FIG. 1B is provided. Yet, it differs only in that a file entry FE for the 'BACKUP' directory for backup is added to the metadata file MD File.

Namely, as mentioned in the foregoing description, since all file entries according to the file structure are recorded in the metadata file MD File, the file entry for the file during the 'BACKUP' directory will be recorded in the metadata in case of the 'BACKUP' directory of FIG. 2A.

Meanwhile, a method of recording (updating) metadata in a continuous session is explained with reference to FIG. 3 and FIG. 4 as follows.

Namely, a session for data recording is allocated during a write-once optical disc. After completion of the data recording during the session, the corresponding session is closed to remain as a play-only area without further recording thereon. And, file information is recorded in a metadata file area during the corresponding session. Thus, various methods of recording (updating) the file information in the metadata file area are explained.

Figure 3:
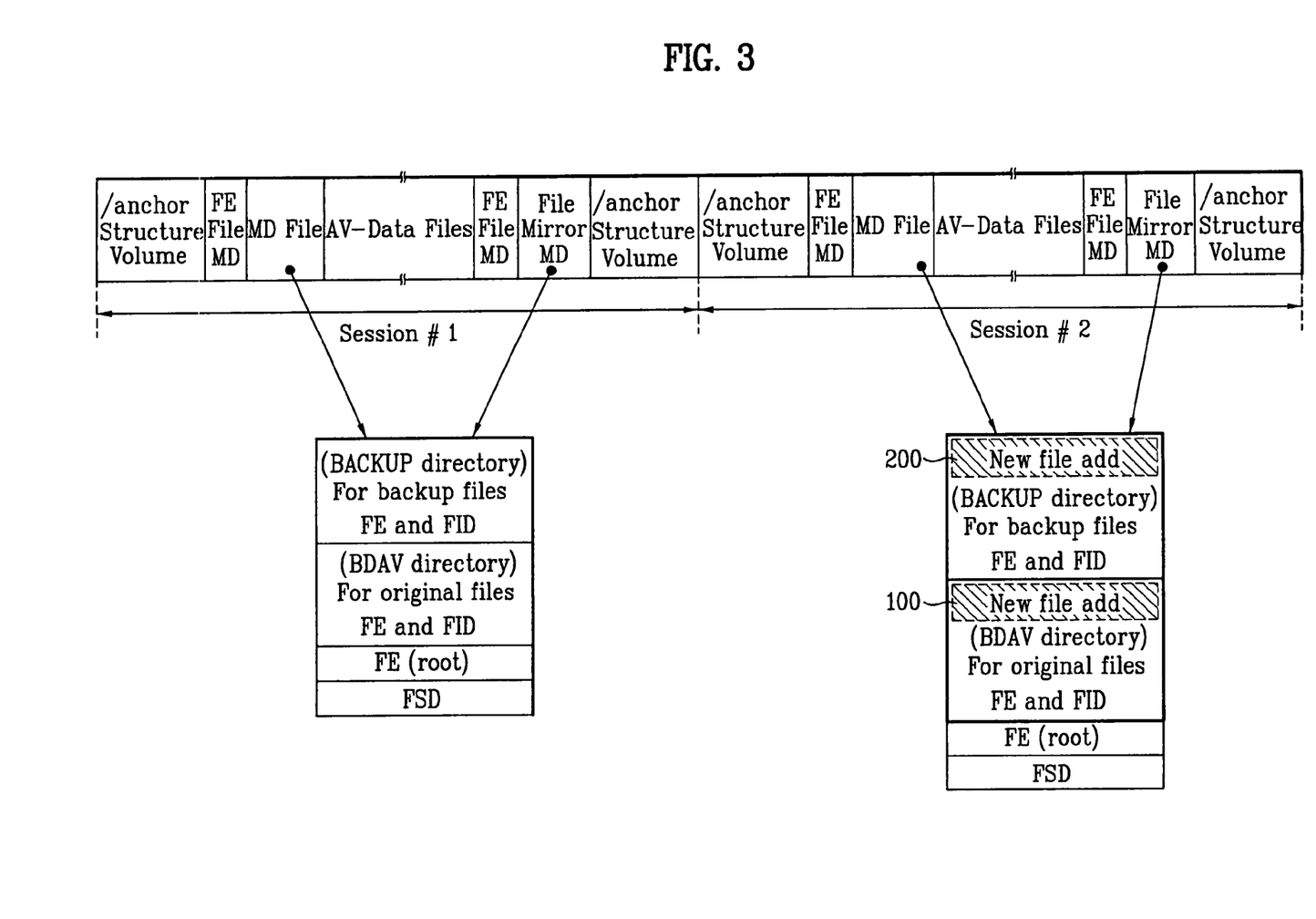
FIG. 3 is a structural diagram for explaining a method of updating file system information in a write-once high density optical disc according to a first embodiment of the present invention.

FIG. 3 shows a method of recording (updating) metadata according to a first embodiment of the present invention, which is characterized in recording file information of a former session and updated file information of a current session in a metadata file of the current session together.

For instance, in recording metadata during a session #2, a file newly added during a current session is updated to the metadata already recorded during the session #1 to be recorded during the current session (session #2) together.

Hence, if a newly added file 100 and a corresponding backup file 200 exist in a session #2 recording, the new files 100 and 200 are added to the metadata of the former session #1 in a metadata file (MD file) area within the session #2 to update the metadata.

Therefore, in spite of reproducing the metadata recorded on a most outer circumference within the session, the optical record/reproduction apparatus in FIG. 5 can check the file structure and file-recorded locations within the entire disc, thereby enabling a quick search for file.

Figure 4A:
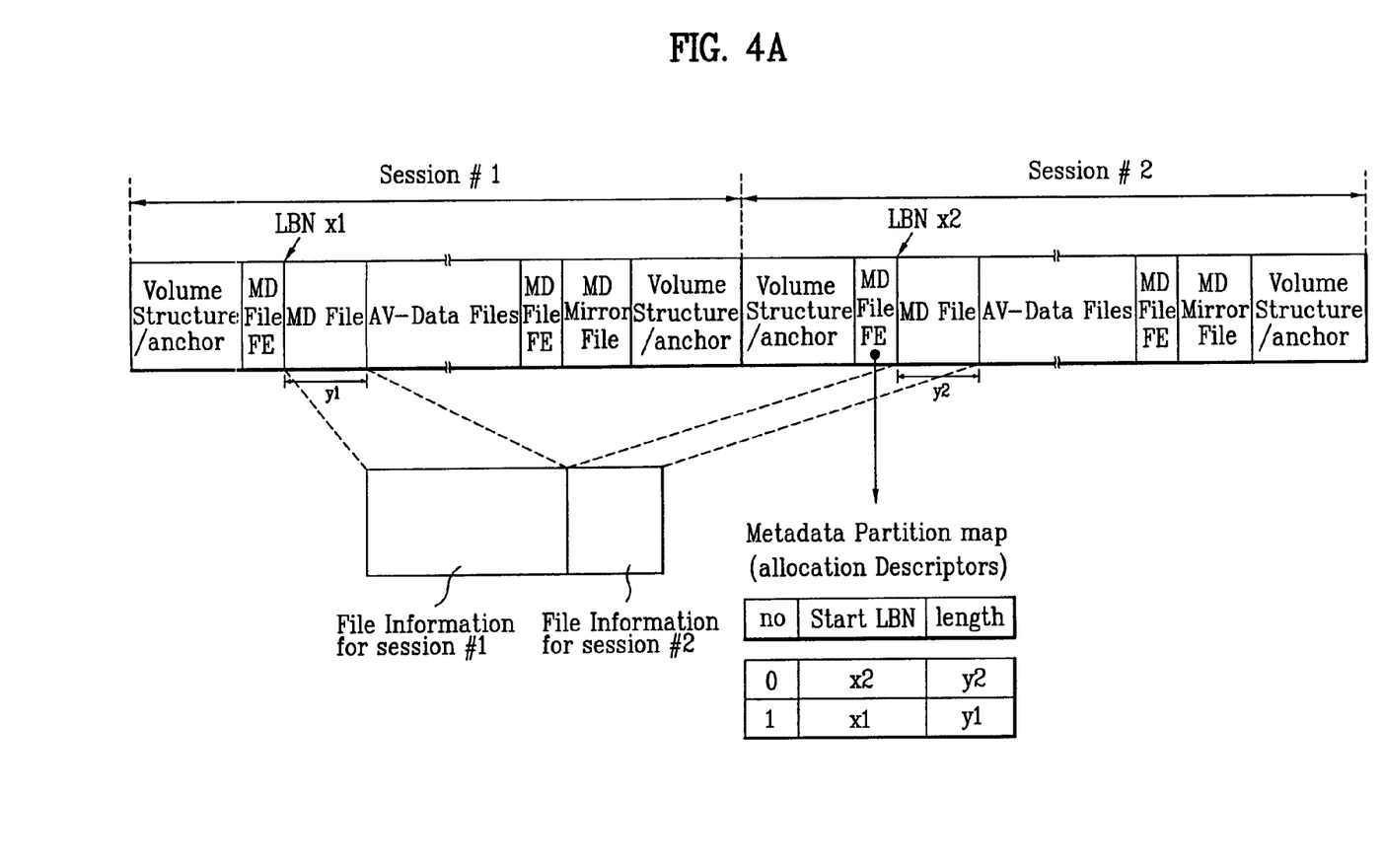
FIGS. 4A to 4C are structural diagrams for explaining a method of updating file system information in a write-once high density optical disc according to a second embodiment of the present invention.

FIG. 4A shows a method of recording (updating) metadata according to a second embodiment of the present invention, which is characterized in recording file information updated from that of a former session in a metadata file of a current session and in recording information indicating a location of a per session metadata file in the current session.

Namely, the metadata for the file occurring within a session #1 is recorded in a metadata file (MD File) area within the corresponding session #1, and the metadata for the file occurring within a session #2 is recorded in a metadata file (MD File) area within the corresponding session #2. Hence, each of the files recorded within the corresponding session is recorded in the metadata file area of the corresponding session only. Therefore, it is able to efficiently utilize a disc volume.

Yet, in order to check the file structure of the entire disc, the metadata file MD File within the former session needs to be confirmed. For this, location information including a metadata file (MD File) area of the former session is recorded within a 'MD File FE' area of the current session, which is called 'Metadata Partition map'.

For instance, 'Metadata Partition map' is recorded in the MD File FE' area of the session #2 in FIG. 4A. The 'Metadata Partition map' includes 'Start LBN' and 'Length' fields of each metadata file (MD File) area. And, information designating a location LBN x1 and size y1 of the metadata file (MD File) within the former session (session #1) or a location LBN x2 and size y2 of the metadata file (MD File) within the current session (session #2) in the 'Start LBN' and 'Length' fields, respectively.

Figure 4B:
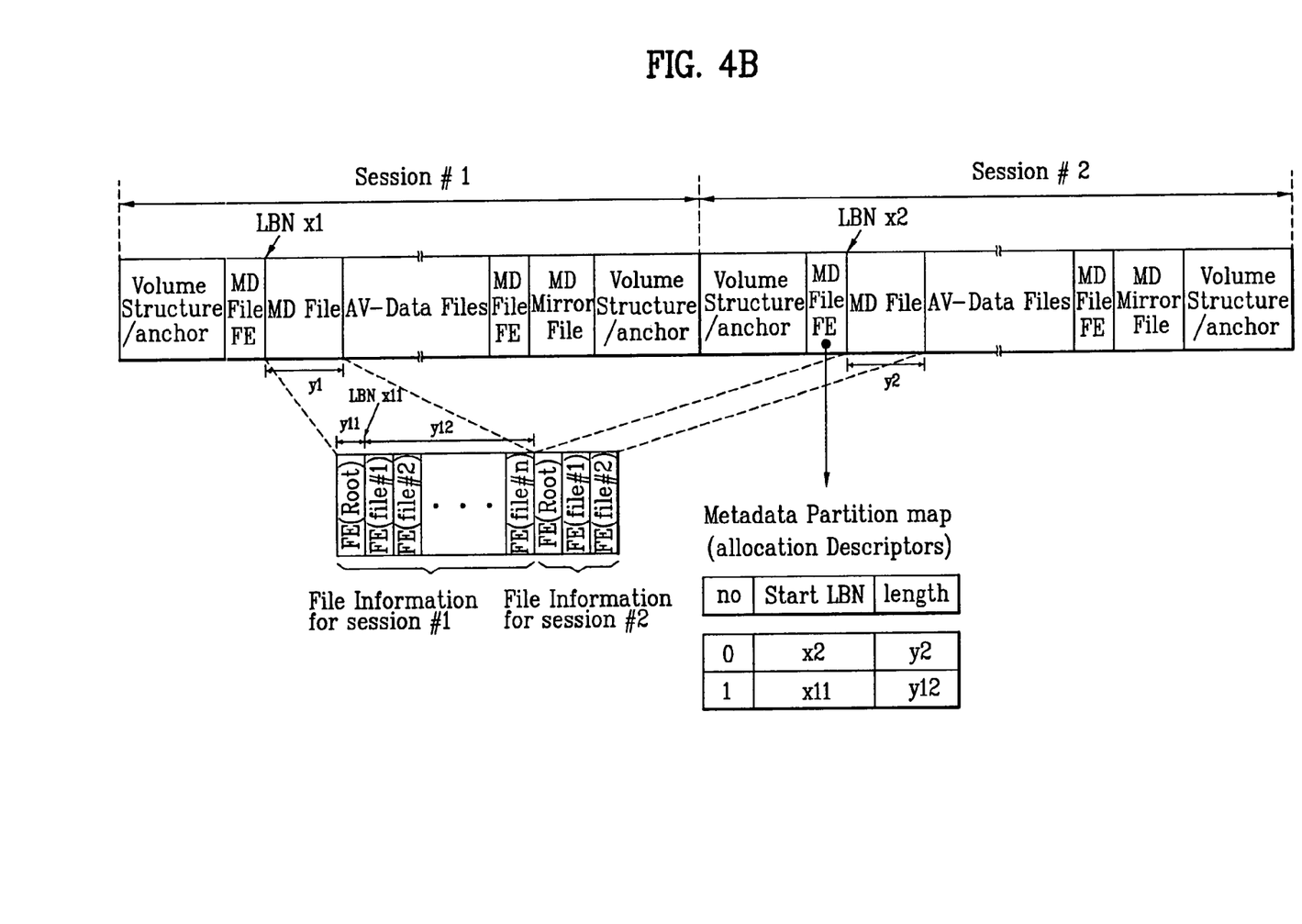
Figure 4C:
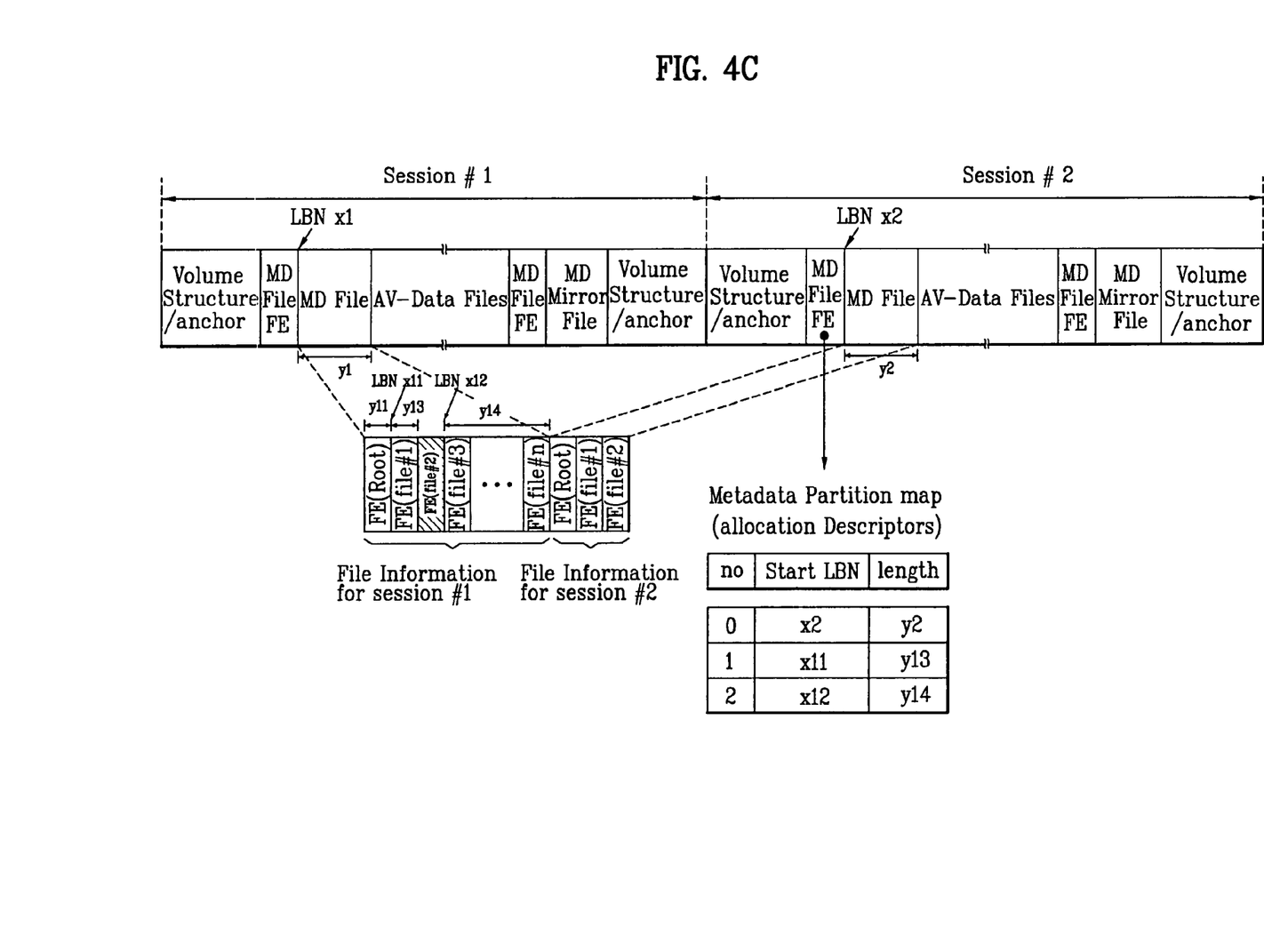

FIG. 4B and FIG. 4C show examples of recording the metadata partition map in the method of recording (updating) the metadata according to the second embodiment of the present invention in FIG. 4A, respectively.

The example of FIG. 4B is characterized in recording the metadata partition map not to reproduce a file entry (FE (root)) for a root directory recorded in the metadata file MD File within the former session in recording the metadata partition map within a final session.

For instance, a file entry FE(root) for a root directory and file entries FE(file #1)~FE(file #n) associated with a session #1 are recorded within a metadata file MD File of the session #1 and a file entry FE(root) for the root directory and file entries FE(file #1) and FE(file #2) associated with a session #2 are recorded within a metadata file MD File of the session #2. If so, a metadata partition map recorded within 'MD File FE' of the session #2 is configured as follows.

Namely, as the root directories exists in the session #1 and the session #2, respectively, an optical record/reproduction apparatus in FIG. 5 should record the metadata partition map within the session #2 to reproduce the root directory of the session #2 as the final session.

Consequently, in order to confirm the entire file entries including the root directory within the session #2 in the metadata partition map within the session #2, the first entry is configured to perform reproduction from 'LBN x2' as a start LBN. And, the second entry is configured to perform reproduction from 'LBN x11' as a start LBN except the root directory within the session #1 despite indicating the metadata file of the session #1.

The example of FIG. 4C is characterized in recording the metadata partition map not to reproduce a file entry (FE (root)) for a root directory recorded in the metadata file MD File within the former session and to consider a newly edited file structure (e.g., file delete), in recording the metadata partition map within a final session.

For instance, a file entry FE(root) for a root directory and file entries FE(file #1)~FE(file #n) associated with a session #1 are recorded within a metadata file MD File of the session #1 and a file entry FE(root) for the root directory and file entries FE(file #1) and FE(file #2) associated with a session #2 are recorded within a metadata file MD File of the session #2. In case that a file #2 of the session #1 is deleted in recording the session #2, a metadata partition map recorded within 'MD File FE' of the session #2 is configured as follows.

Namely, the metadata partition map is recorded within the session #2 not to reproduce the deleted file #2 of the session #1.

Consequently, in order to confirm the entire file entries including the root directory within the session #2 in the metadata partition map within the session #2, the first entry is configured to perform reproduction from 'LBN x2' as a start LBN. The second entry indicates the metadata file of the session #1 and is configured to perform reproduction from 'LBN x11' as a start LBN except the root directory within the session #1 prior to a location of the file #2. And, the third entry is configured to perform reproduction from 'LBN x12' as a location of the file #3 of the session #1.

As explained in the description of FIGS. 4A to 4C, an optical record/reproduction apparatus in FIG. 5 always reads the 'MD File FE' information within a most outer circumferential session, thereby confirming the location of the metadata file MD File remaining valid within the entire disc. And, the apparatus reads the per session metadata from the confirmed location, thereby confirming the file information within the entire disc.

Moreover, the present invention is described by taking the multi-session disc, to which a plurality of sessions are applicable, as an example. It is apparent that the technical background of the present invention is applicable to all cases that a recording area within a disc is partitioned by a specific method.

An optical record/reproduction apparatus and an optical disc reproduction method using the same are explained with reference to FIG. 5 as follows.

FIG. 5 shows a configuration of an optical record/reproduction apparatus according to the present invention.

Referring to FIG. 5, an optical record/reproduction apparatus according to the present invention basically includes a pickup unit 11 reading out data and file system information recorded within an optical disc, a servo 14 controlling an operation of the pickup unit 11, a signal processing unit 13 restoring a reproduction signal received from the pickup unit 11 into a specific signal value or modulating a signal to be recorded into a signal to be recorded in the optical disc to deliver to the pickup unit 11, a memory 15 temporarily storing the file system information read from the optical disc, and a microcomputer 16 controlling the operation.

The control unit 12, which is an element of controlling operations of the overall optical record/reproduction apparatus, receives a user command and then delivers the received user command to the microcomputer 16 within a record/reproduction unit, thereby being operative in controlling the corresponding operation to be performed according to the user command. Specifically, the control unit 12 delivers a record/reproduction command to the microcomputer 16 by utilizing the file system information transferred from the microcomputer 16.

An AV decoder 17 finally decodes output data according to a control of the control unit 12 to provide the decoded data to a user. In order to perform a function of recording a signal in the optical disc, an AV encoder 18 converts an input signal to a specifically formatted signal such as an MPEG2 transport stream according to a control of the control unit 12 to provide the converted signal to the signal processing unit 13 within the record/reproduction unit.

A method of reproducing a write-once optical disc having the aforesaid file system information recorded therein using the optical record/reproduction apparatus according to the present invention is explained in detail as follows.

First of all, once an optical disc having the metadata updated by the method according to the first embodiment of the present invention in FIG. 3 is loaded, the control unit 12 reads the file information of entire closed session areas recorded within the metadata file (MD File) within a final closed session and then controls the microcomputer 16 to execute the reproduction of the closed sessions using the read file information.

Namely, since the file information of the former closed session is recorded within the metadata file (MD File) existing within the final closed session of the disc, it is able to read the entire file information by reproducing the corresponding last metadata file (MD File) only.

Secondly, once an optical disc having the metadata updated by the method according to the second embodiment of the present invention in FIG. 4 is loaded, the control unit 12 reads the metadata partition map indicating the location of the entire metadata file within the final closed session, reads the file information recorded within at least one closed session area from the read metadata partition map, and then controls the microcomputer 16 to execute the reproduction of the closed session area using the read file information.

Namely, the entire disc file information is read in a manner of reading the metadata partition map within the 'MD File FE' area within the final closed session to confirm the locations of the metadata files (MD File) within the current and former closed sessions and then reproducing the entire metadata files recorded in the confirmed locations.

Hence, in order to acquire the final file information, the second embodiment of the present invention enables the confirmation of the location of the valid metadata file recorded within the disc by the data partition map. Hence, the present invention can solve the problem in searching the sessions sequentially from the initial start location to acquire the file system information.

Accordingly, by the file system recording method of the high density optical disc according to the present invention, the robust file system information can be provided as well as the efficient reproduction of the optical disc is enables using the newly configured file system information.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of reproducing file information of a recording medium, the recording medium including at least a former closed session and a last closed session, the method comprising steps of:
reading a partition map within a partition map area of the last closed session, the partition map including information indicating the location of first file information associated with the former closed session and the location of second file information associated with the last closed session, the first file information being prerecorded within a file information area of the former closed session and the second file information being prerecorded within a file information area of the last closed session; and
reproducing the first file information and the second file information based on the read partition map.

2. The method of claim 1, wherein the partition map comprises at least two partition entries, each partition entry comprising a start location and size of the associated file information.

3. A method of recording file information of a recording medium, the method comprising steps of:
recording second file information associated with a current session within a file information area of the current session; and
recording a partition map within a partition map area of the current session, the partition map including information indicating the location of the second file information associated with the current session and the location of first file information associated with a former session, the first file information being prerecorded within a file information area of the former session.

4. The method of claim 3, wherein the partition map comprises at least two partition entries, each partition entry comprising a start location and size of the associated file information.

5. An apparatus of reproducing file information of a recording medium, the recording medium including at least a former closed session and a last closed session, comprising:
a pickup unit configured to read data from the recording medium; and
a controller configured to control the pickup unit to read a partition map within a partition map area of the last closed session, the partition map including information indicating the location of first file information associated with the former closed session and the location of second file information associated with the last closed session, the first file information being prerecorded within a file information area of the former closed session and the second file information being prerecorded within a file information area of the last closed session, and the controller configured to control to reproduce the first file information and the second file information based on the read partition map.

6. The apparatus of claim 5, wherein the partition map comprises at least two partition entries, each partition entry comprising a start location and size of the associated file information.

7. An apparatus of recording file information of a recording medium, comprising:
a pickup unit configured to record data on the recording medium; and
a controller configured to control the pickup unit to record second file information associated with a current session within a file information area of the current session, and the controller configured to further control the pickup unit to record a partition map within a partition map area of the current session, the partition map including information indicating the location of the second file information associated with the current session and the location of first file information associated with a former session, the first file information being prerecorded within a file information area of the former session.

8. The apparatus of claim 7, wherein the partition map comprises at least two partition entries, each partition entry comprising a start location and size of the associated file information.

* * * * *